United States Patent
Marriott

(10) Patent No.: US 7,849,839 B2
(45) Date of Patent: Dec. 14, 2010

(54) PRE-HEATING FUEL FOR COLD START

(75) Inventor: Craig D. Marriott, Clawson, MI (US)

(73) Assignee: GM Global Technology Operations, Inc.

(*) Notice: Subject to any disclaimer, the term of this patent is extended or adjusted under 35 U.S.C. 154(b) by 183 days.

(21) Appl. No.: 11/685,950

(22) Filed: Mar. 14, 2007

(65) Prior Publication Data

US 2008/0053415 A1    Mar. 6, 2008

Related U.S. Application Data

(60) Provisional application No. 60/842,108, filed on Sep. 1, 2006.

(51) Int. Cl.
*F02M 31/125* (2006.01)

(52) U.S. Cl. ........................... 123/549; 123/557

(58) Field of Classification Search ........... 123/434, 123/435, 445, 472, 543, 545, 549, 557, 558, 123/554, 555, 490, 498, 499; 239/135, 585.1, 239/585.2, 585.3, 585.4, 128; 137/334, 341
See application file for complete search history.

(56) References Cited

U.S. PATENT DOCUMENTS

| 3,999,525 | A | * | 12/1976 | Stumpp et al. | 123/557 |
| 4,886,032 | A | * | 12/1989 | Asmus | 123/557 |
| 5,201,341 | A | * | 4/1993 | Saito et al. | 137/341 |
| 5,322,046 | A | * | 6/1994 | Birch et al. | 123/494 |
| 5,915,626 | A | * | 6/1999 | Awarzamani et al. | 239/135 |

FOREIGN PATENT DOCUMENTS

| DE | 10136049 A1 | * | 2/2003 |
| GB | 2307513 A | * | 5/1997 |

* cited by examiner

*Primary Examiner*—Michael Cuff
*Assistant Examiner*—Hung Q Nguyen

(57) ABSTRACT

A method of pre-heating a fuel in an internal combustion engine includes inducing a current in a solenoid coil of a fuel injector of the internal combustion engine and heating the fuel within the fuel injector using heat generated by the current before initiating a combustion cycle of the engine.

21 Claims, 2 Drawing Sheets

PRE-HEATING FUEL FOR COLD START

CROSS-REFERENCE TO RELATED APPLICATIONS

This application claims the benefit of U.S. Provisional Application No. 60/842,108, filed on Sep. 1, 2006. The disclosure of the above application is incorporated herein by reference.

FIELD

The present disclosure relates to internal combustion engines, and more particularly to pre-heating fuel for starting an internal combustion engine under cold conditions.

BACKGROUND

The statements in this section merely provide background information related to the present disclosure and may not constitute prior art.

During combustion, an internal combustion engine oxidizes gasoline and combines hydrogen ($H_2$) and carbon (C) with air. Combustion creates chemical compounds such as carbon dioxide ($CO_2$), water ($H_2O$), carbon monoxide (CO), nitrogen oxides ($NO_x$), unburned hydrocarbons (HC), sulfur oxides ($SO_x$), and other compounds. During an initial startup period after a long soak, the engine is "cold" and may resist fuel vaporization, charge ignition and/or complete combustion of the fuel. A catalytic converter treats exhaust gases from the engine. During the startup period, the catalytic converter is also "cold" and does not operate optimally, resulting in unacceptably high emissions.

In one conventional approach, an engine controller commands a lean air/fuel (A/F) ratio and supplies a reduced mass of liquid fuel to the engine to provide compensation. More air is available relative to the mass of liquid fuel to sufficiently oxidize the CO and HC. However, the lean condition reduces fuel vaporization and combustion stability, adversely impacting vehicle drivability.

In another conventional approach, the engine controller commands a fuel-rich mixture for stable combustion and good vehicle drivability. A secondary air injection system provides an overall lean exhaust A/F ratio. The secondary air injector injects air into the exhaust stream during the initial start-up period. The additional injected air heats the catalytic converter by oxidizing the excess CO and HC. The warmed catalytic converter oxidizes CO and HC and reduces $NO_x$ to lower emissions levels. However, the secondary air injection system increases cost and complexity of the engine control system and is only used during a short initial cold start period.

In still another conventional approach, an external device such as a resistive heater and/or a bulb heater can be inserted into the engine compartment to heat the engine prior to starting. The obvious disadvantages of this approach include the cost of the additional equipment, as well as the time required to install and remove the equipment between engine start cycles, and the energy consumed by such equipment. For example, supplemental fuel systems are used in Brazil. Additional fuel rail heaters are also used to promote fuel vaporization.

SUMMARY

Accordingly, the present disclosure provides a method of pre-heating a fuel in an internal combustion engine. The method includes inducing a current in a solenoid coil of a fuel injector of the internal combustion engine and heating the fuel within the fuel injector using heat generated by the current before initiating a combustion cycle of the engine.

By pre-heating the fuel, the vapor pressure of the fuel is increased to the match the fuel partial pressure required for an ignitable fuel air mixture, allowing ignition and more complete combustions thereby improving emissions, particularly during a cold start. Because the present disclosure pre-heats the fuel using equipment already available within the engine, there are no additional costs and no additional space is required within the engine.

In other features, the method further includes monitoring a temperature and executing the inducing when said temperature is below a threshold temperature. The temperature is an engine temperature. Alternatively, the temperature is an ambient temperature.

In another feature, the fuel is heated for a predetermined period of time.

In still other features, the current is below a threshold current. The threshold current is insufficient to initiate actuation of the fuel injector.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 2:
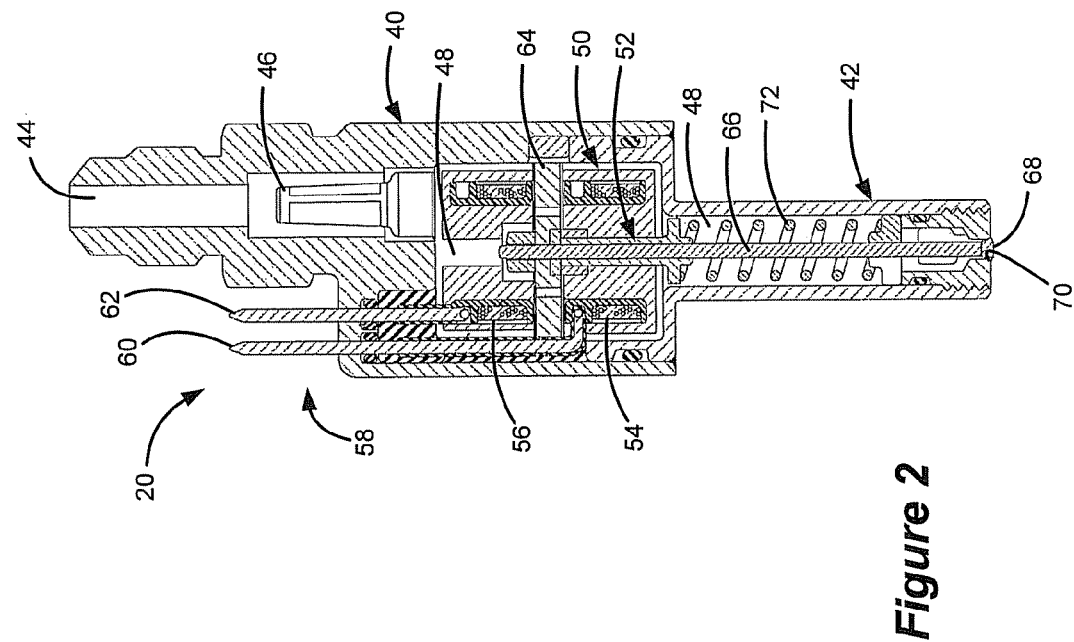
FIG. 2 is a cross-sectional view of an exemplary fuel injector implemented in the exemplary engine of FIG. 1.

The following description of the preferred embodiment is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
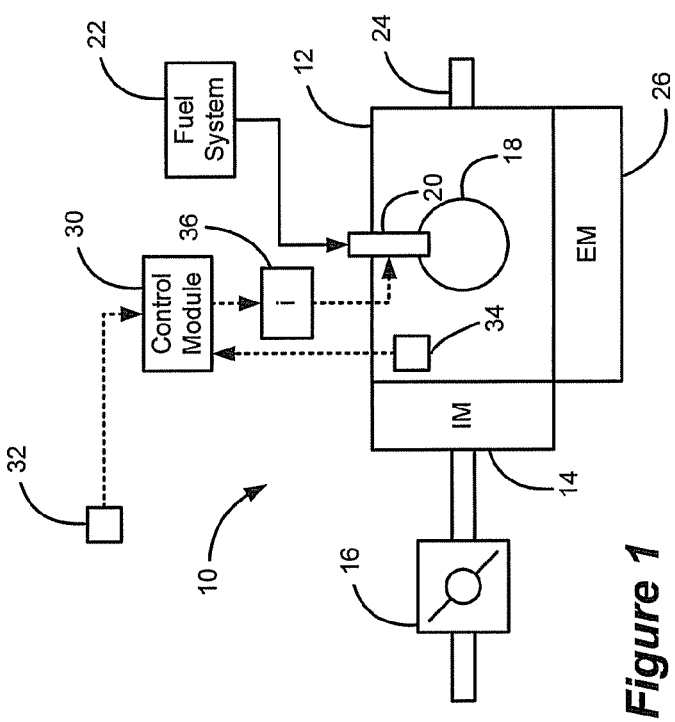
FIG. 1 is a functional block diagram of an exemplary internal combustion engine.

Referring now to FIG. 1, an exemplary engine system 10 is illustrated and includes an engine 12 that generates drive torque. More specifically, air is drawn into an intake manifold 14 through a throttle 16. The air is directed into a cylinder 18 and is mixed with fuel therein to form a combustion mixture. A fuel injector 20 directly injects a desired amount of fuel into the cylinder 18. The fuel is provided from a fuel system 22. The combustion mixture is compressed and ignited within the cylinder 18 to reciprocally drive a piston (not shown), which rotatably drives a crankshaft 24. Exhaust is exhausted from the cylinder 18 and is directed through an exhaust manifold 26, to an exhaust after-treatment system (not shown), and out to atmosphere. Although the exemplary engine 12 includes a single cylinder, it is anticipated that the fuel pre-heat control of the present disclosure can be implemented in engines having any number of cylinders.

A control module 30 regulates operation of the engine system 10. More specifically, an ambient temperature sensor 32 is responsive to an ambient temperature ($T_{AMB}$) and generates a signal based thereon. An engine temperature sensor 34 is responsive to an engine temperature ($T_{ENG}$) and generates a signal based thereon. $T_{ENG}$ can be provided as a temperature of an engine oil and/or coolant or can be provided as a temperature of an engine component (e.g., engine block). The control module 30 selectively generates control signals based on $T_{AMB}$ and/or $T_{ENG}$, as discussed in further detail below, to control a current driver 36 that regulates the current provided to the fuel injector 20.

Referring now to FIG. 2, an exemplary fuel injector 20 is illustrated. The exemplary fuel injector 20 is described in full detail in commonly assigned U.S. Pat. No. 6,065,684, issued on May 23, 2000 and entitled Fuel Injector and Method, the disclosure of which is expressly incorporated herein by reference. The exemplary fuel injector 20 includes an upper assembly 40 and a lower assembly 42. The upper assembly 40 includes a fuel inlet 44 and a fuel filter 46, through which fuel flows into an interior cavity 48 that is defined within the upper and lower assemblies 40, 42.

A solenoid assembly 50 is located within the upper assembly 40 and selectively actuates a valve assembly 52 that extends between the upper and lower assemblies 40, 42. The solenoid assembly 50 includes a plurality of solenoid coils 54, 56, which are in electrical communication with the current driver 36 through a drive circuit 58 that includes terminals 60, 62. The valve assembly 52 includes an armature 64 that is disposed between the solenoid coils 54, 56 and that is fixedly attached to a pintle 66. The pintle 66 includes a valve head 68 that seats against a valve seat 70 located at the end of the lower assembly 42. A spring 72 biases the armature 64 and pintle 66 up towards the upper assembly 40, ensuring that the valve head 68 seats against the valve seat 70. The solenoid coils 54, 56 are selectively actuated to induce downward movement of the armature 64 and pintle 66 against the biasing force of the spring 72. As the valve head 68 moves from the valve seat 70, pressurized fluid within the interior cavity 48 escapes from the fuel injector 20 and is injected into the cylinder 18.

The fuel pre-heating control of the present disclosure selectively pre-heats fuel that is to be delivered to the cylinder using the fuel injector and associated drive circuitry. More specifically, the fuel pre-heating control heats the fuel that is present within the fuel injector using energy dissipated from the solenoid coil and driver circuit. Heating of the fuel increases the vapor pressure of the fuel, enhancing fuel vaporization and startability. The fuel pre-heating control is particularly advantageous when used with fuels having high ethanol content, low Reid Vapor Pressure (RVP) or low Drivability Index (DI).

In one embodiment, the fuel pre-heating control pre-heats the fuel when the impending engine start is deemed to be a cold start. Whether the engine start is considered a cold start can be determined based on $T_{AMB}$ and/or $T_{ENG}$. For example, if $T_{AMB}$ is below a threshold ($T_{THR}$), the engine start is deemed to be a cold start. Optionally, if $T_{ENG}$ is below a cold start threshold ($T_{CS}$), the engine start is deemed to be a cold start. $T_{ENG}$ is preferably used because it is more indicative of the fuel vaporization capability of the engine. For example, even if the engine is resting in at a $T_{AMB}$ that is below $T_{THR}$, $T_{ENG}$ may still be above $T_{CS}$ if the engine has only been resting for a short period of time since last running.

The fuel pre-heat control heats the fuel for a threshold time period before ignition is initiated. The heat is generated by the solenoid coil without opening the pintle of the valve, thereby preventing fuel from injecting into the cylinder. This is accomplished by providing low current or cold start current ($i_{CS}$) to the injector solenoid coil for the threshold time period ($t_{THR}$) before initiating ignition. $i_{CS}$ is low enough to not generate sufficient force to counteract the closing spring and move the injector armature, which would otherwise result in fuel being prematurely injected into the cylinder. The current control is enabled using the variable current driver.

$t_{THR}$ can be determined based on a number of factors including, but not limited to, the mass of the fuel that is to be heated, the specific type of fuel and/or properties of the fuel. For example, $t_{THR}$ may be longer if it is desired to heat all of the fuel that is present within the cavity 48 and may be shorter if it is desired to only heat a portion of the fuel within the cavity 48 (e.g., the fuel within the lower assembly 42). $t_{THR}$ can also vary based on the monitored temperature (e.g., $T_{AMB}$ and/or $T_{ENG}$). For example, if the monitored temperature is significantly below the threshold (e.g., $T_{THR}$ or $T_{CS}$), the fuel may take longer to heat. Accordingly, $t_{THR}$ is longer. If the monitored temperature is slightly below the threshold (e.g., $T_{THR}$ or $T_{CS}$), the fuel may not take very long to heat. Accordingly, $t_{THR}$ is shorter.

Figure 3:
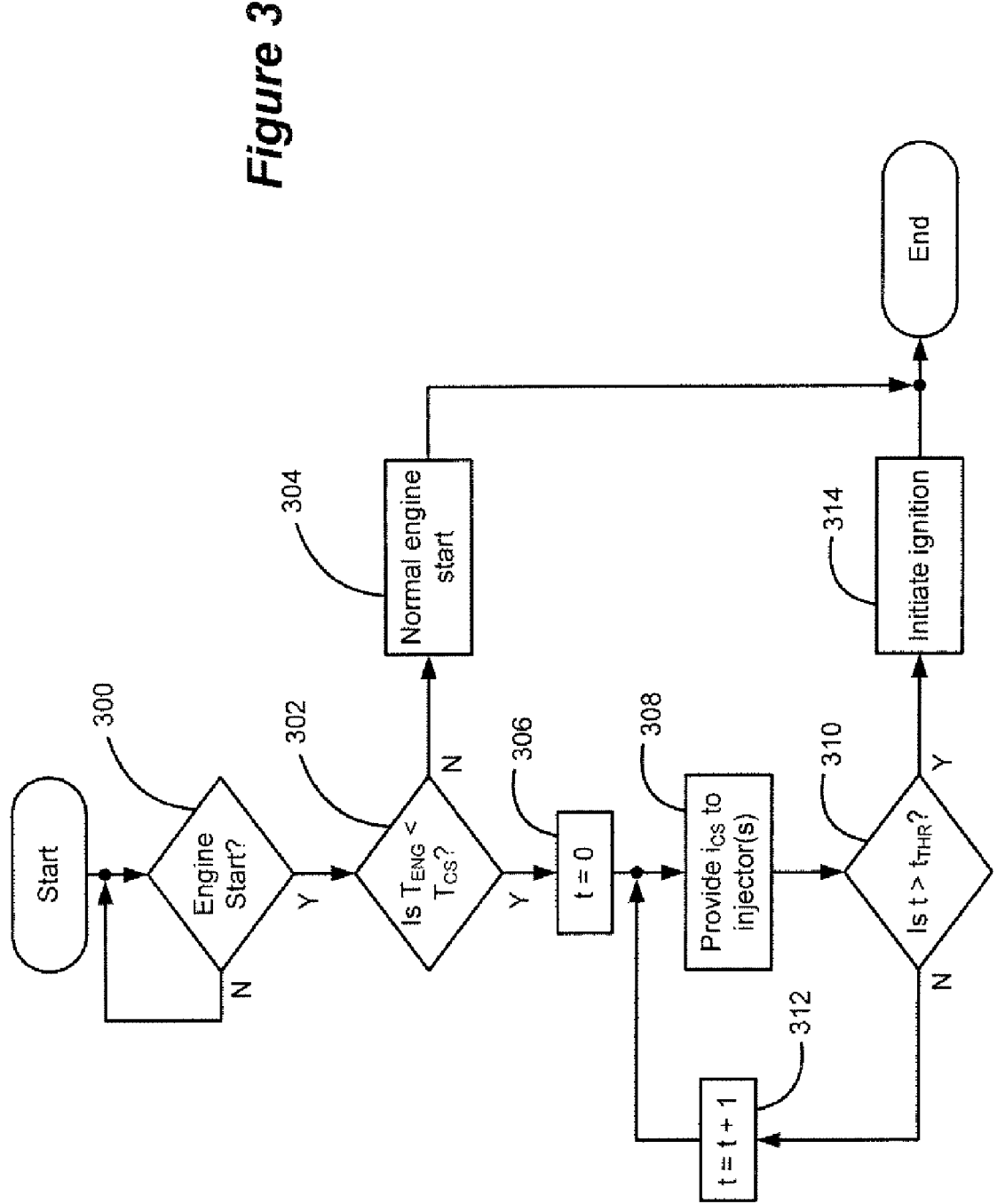
FIG. 3 is a flowchart illustrating exemplary steps that are executed by the fuel pre-heating control of the present disclosure.

Referring now to FIG. 3, exemplary steps that are executed by the fuel pre-heat control will be described in detail. In step 300, control determines whether an engine start is requested. This is generally determined based on a driver requester, which can typically be generated based on a key position. If an engine start is not requested, control loops back. If an engine start is requested, control determines whether $T_{ENG}$ is less than $T_{CS}$ in step 302. If $T_{ENG}$ is not less than $T_{CS}$, control initiates a normal engine start in step 304 and control ends. If $T_{ENG}$ is less than $T_{CS}$, control continues in step 306.

In step 306, control sets a timer t equal to zero. Control provides $i_{CS}$ to the injector or injectors in step 308. In step 310, control determines whether t is greater than $t_{THR}$. If t is greater not greater than $t_{THR}$, control increments t in step 312 and loops back to step 308. If t is greater than $t_{THR}$, control initiates ignition in step 314 and control ends.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of pre-heating a fuel in an internal combustion engine, comprising:

supplying a first current to a solenoid coil of a fuel injector of said internal combustion engine when said fuel is present in said fuel injector, wherein said first current is lower than a predetermined current that is sufficient to counteract force produced by a closing spring of said fuel injector;

heating said fuel within said fuel injector surrounding said solenoid coil using heat generated by said solenoid coil during a startup of said internal combustion engine;

determining a threshold period based on a mass of said fuel in said fuel injector; and initiating ignition of said internal combustion engine during said startup and subsequent to said threshold period, wherein said fuel is heated prior to initiating ignition of said internal combustion engine, and wherein said heating of said fuel is performed during said threshold period.

2. The method of claim 1 further comprising:
monitoring a temperature; and
executing said generating when said temperature is below a threshold temperature.

3. The method of claim 2 wherein said temperature is an engine temperature.

4. The method of claim 2 wherein said temperature is an ambient temperature.

5. The method of claim 1 wherein said heating of said fuel occurs for a predetermined period of time.

6. The method of claim 1, further comprising:
generating a second current in a second solenoid coil of said fuel injector; and
heating said fuel within said fuel injector surrounding said second solenoid coil using heat dissipated by said second solenoid coil.

7. The method of claim 1, further comprising:
determining a threshold period based on an ambient temperature and a temperature of said internal combustion engine,
wherein said heating of said fuel is performed during said threshold period; and
initiating ignition of said internal combustion engine during said startup and subsequent to said threshold period.

8. The method of claim 1, further comprising determining an amount of said fuel in said fuel injector to heat,
wherein said threshold period is determined based on said amount of said fuel in said fuel injector to heat.

9. The method of claim 1, further comprising:
determining a first threshold period when all of said fuel in said fuel injector is to be heated; and
determining a second threshold period when a portion of said fuel in said fuel injector is to be heated,
wherein said first current is supplied based on a selected one of said first threshold period and said second threshold period.

10. A system for pre-heating a fuel in an internal combustion engine, comprising:
a fuel injector that is disposed within said internal combustion engine, that includes a solenoid coil and that has a fuel present therein;
a first module that induces a first current in said solenoid coil of said fuel injector; and
a control module that determines a period of time based on a mass of said fuel, wherein said control module determines said mass of said fuel based on a volume of a cavity within said fuel injector in which said fuel is contained,
wherein said fuel within said fuel injector surrounding said solenoid coil is heated using heat generated by said solenoid coil for said period of time during a startup of said internal combustion engine and before initiating ignition of said engine,
wherein said first current is lower than a predetermined current that is sufficient to supply fuel, and
wherein said first module induces said first current to heat said fuel prior to initiating ignition of said internal combustion engine.

11. The system of claim 10 further comprising a second module that monitors a temperature and that signals said first module to induce said current when said temperature is below a threshold temperature.

12. The system of claim 11 wherein said temperature is an engine temperature.

13. The system of claim 11 wherein said temperature is an ambient temperature.

14. The system of claim 10 wherein said fuel is heated for a predetermined period of time.

15. The system of claim 10, wherein said fuel injector includes a second solenoid coil and said first module generates a second current in said second solenoid coil, wherein said fuel surrounding said second solenoid coil is heated using heat generated by said second solenoid coil.

16. A method of starting an internal combustion engine, comprising:
generating a first current in a solenoid coil of a fuel injector of said internal combustion engine when a fuel is present in said fuel injector; and
heating said fuel within said fuel injector using heat generated by said current during a startup of said internal combustion engine and for a predetermined period of time before initiating ignition of said internal combustion engine,
wherein said predetermined period of time is determined based on a mass of said fuel that is to be heated and wherein said first current is lower than a predetermined current that is sufficient to counteract force of a closing spring of said fuel injector.

17. The method of claim 16 further comprising:
monitoring a temperature; and
executing said generating when said temperature is below a threshold temperature.

18. The method of claim 16 wherein said temperature is an ambient temperature.

19. The method of claim 16 wherein said mass of said fuel that is to be heated is at least partially determined based on a volume of a cavity within said fuel injector, in which said fuel is contained.

20. The method of claim 16, further comprising heating said fuel surrounding said solenoid using heat dissipated by said solenoid coil.

21. The method of claim 16, further comprising:
generating a second current in a second solenoid coil of said fuel injector; and
heating said fuel within said fuel injector surrounding said second solenoid coil using heat generated by said second solenoid coil.

* * * * *